United States Patent
Stickles et al.

(10) Patent No.: US 11,203,257 B2
(45) Date of Patent: *Dec. 21, 2021

(54) MULTI CONFIGURABLE HALF TOP ASSEMBLY

(71) Applicant: Bestop, Inc., Louisville, CO (US)

(72) Inventors: George C. Stickles, Thornton, CO (US); Eric D. Getzschman, New Baltimore, MI (US); Stephen J. Lewis, Harrison Township, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,364

(22) Filed: Sep. 26, 2019

(65) Prior Publication Data

US 2020/0016966 A1    Jan. 16, 2020

Related U.S. Application Data

(63) Continuation of application No. 15/950,963, filed on Apr. 11, 2018, now Pat. No. 10,457,129.

(60) Provisional application No. 62/484,223, filed on Apr. 11, 2017.

(51) Int. Cl.
| | |
|---|---|
| *B60J 1/18* | (2006.01) |
| *B60J 7/14* | (2006.01) |
| *B60J 10/70* | (2016.01) |
| *B60J 7/12* | (2006.01) |
| *B60R 21/13* | (2006.01) |

(52) U.S. Cl.
CPC .............. *B60J 10/70* (2016.02); *B60J 7/1291* (2013.01); *B60J 7/146* (2013.01); *B60R 2021/132* (2013.01); *B60Y 2200/141* (2013.01)

(58) Field of Classification Search
CPC .............. B60R 2021/132; B60R 21/13; B62D 25/2036; B60J 1/18; B60J 1/1807; B60J 10/0062; B60J 1/10; B60J 10/70
USPC .................. 280/756, 801.1, 808; 286/183.06, 286/146.15; 296/193.06, 146.15
See application file for complete search history.

(56) References Cited

U.S. PATENT DOCUMENTS

| | | | | |
|---|---|---|---|---|
| 3,687,484 A | * | 8/1972 | Cosby ................. | B66F 9/07554 |
| | | | | 280/755 |
| 6,435,606 B1 | * | 8/2002 | Miklosi ................ | B60J 7/0053 |
| | | | | 296/216.07 |
| 6,568,751 B2 | * | 5/2003 | Reinsch ................ | B60J 7/0061 |
| | | | | 296/107.09 |

* cited by examiner

*Primary Examiner* — Dennis H Pedder
(74) *Attorney, Agent, or Firm* — Warn Partners, P.C.

(57) ABSTRACT

A top for a Jeep type vehicle is provided having a rear cargo area and parallel spaced roll bars. The top includes parallel spaced apart C pillars, each C pillar including front and rear vertical columns, the rear columns having a perpendicularly connected seat belt pass-through. The C pillars also have bottom plates connecting the front and rear columns that extend beyond the rear column. A top plate connects the front and rear columns together. The C pillars include pivotally connected sealing plates for sealing a top end of a rear door, the sealing plates being connected to the roll bars. A vertical rear window extending between said C pillar rear columns is provided, the rear window having a cutout portion for allowance of passage of a seat belt therethrough. A fabric cover providing a top deck extends over said front and rear seating portion of said vehicle and also covers the C pillars. A tonneau cover is provided for covering the rear cargo area providing a flat surface enclosure over the cargo area.

9 Claims, 7 Drawing Sheets

MULTI CONFIGURABLE HALF TOP ASSEMBLY

CROSS-REFERENCE TO RELATED APPLICATIONS

This application is a continuation of U.S. patent application Ser. No. 15/950,963, filed Apr. 11, 2018, which claims the benefit of U.S. Provisional Application No. 62/484,223, filed Apr. 11, 2017. The disclosures of the above applications are incorporated herein by reference.

FIELD OF THE INVENTION

The present invention relates to a customized top for four-door Jeep types vehicles.

BACKGROUND OF THE INVENTION

Many consumers prefer a truck styled fabric top with covered storage in a rear cargo area that is covered with soft or hard tonneau to create a secure cargo area. Objectives: Design soft top with one-hand easy open Sunrider and with soft/hard tonneau cargo area coverage. Secure storage should be a standalone. Individual accessory pieces, such as Bestop Windjammer®, Bikini® and Duster® provide same coverage of a Jeep cockpit, rear curtain and cargo area. Windjammer®, Bikini®, Duster® (all trademarks for soft top products owned by Bestop, Inc.) are separate pieces and are not as weather tight as a one-piece Half Top. Windjammer, Bikini, Duster do not contain features and benefits including Sunrider for Hard Top® folding mechanism, zipper-less design and spring loaded fabric tensioning designs.

SUMMARY OF THE INVENTION

The present invention incorporates a Sunrider for Hard Top® folding soft top mechanism, a Dual Sunrider, zipper less glass design and spring loaded fabric tensioning system for the top system. The zipper less design enables the removal and installation of quarter windows and rear curtains with ease and speed. The self-tensioning spring loaded fabric mechanism and/or inflating airbag tensioning systems keep fabric from becoming loose and floppy. Structural seatbelt pass through design organizes the seatbelt harness to freely pass through fabric and PVC plastic windows preventing hindering of seat belt deployment. Incorporating rear curtain fabric in seatbelt pass through area is attached with sewn-in molded rubber grommet and/or hook and loop product. A hard tonneau option with InstaTrunk style rear panel design creates secure locked storage in the Halftop with top installed, completely off or in the Sunrider position. The center bow prevents water from pooling on the soft fabric tonneau. Lighting is attached to the center bow to illuminate the rear cargo area.

The above improvements provide an improved multi configurable half top assembly for a jeep or UTV vehicle having a rear entry gate. In one embodiment at least one fold back soft top portion is included which may be slide able on a track. The rear portion of the vehicle includes attachments for forming a secure compartment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 7:
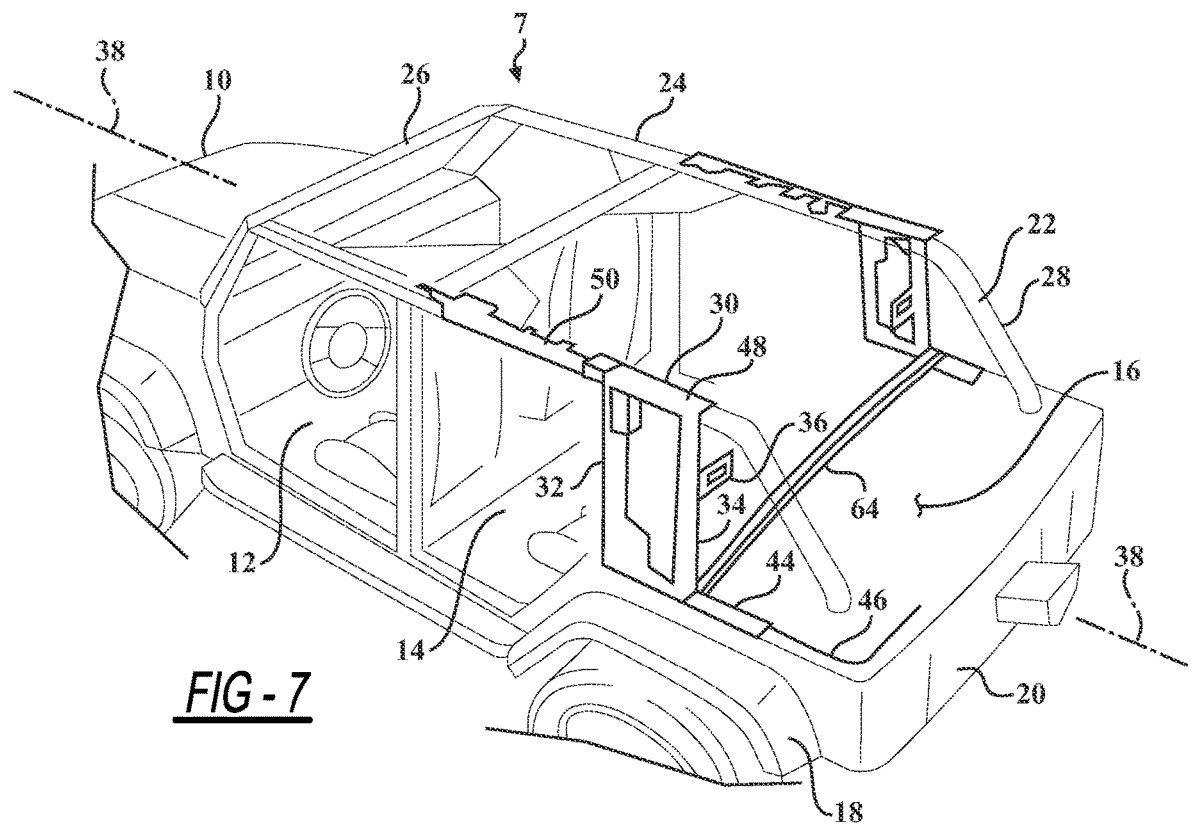
FIGS. 7 and 8 illustrates an embodiment of the invention illustrating the C pillars of the top system before installation of a cover.
Figure 8:
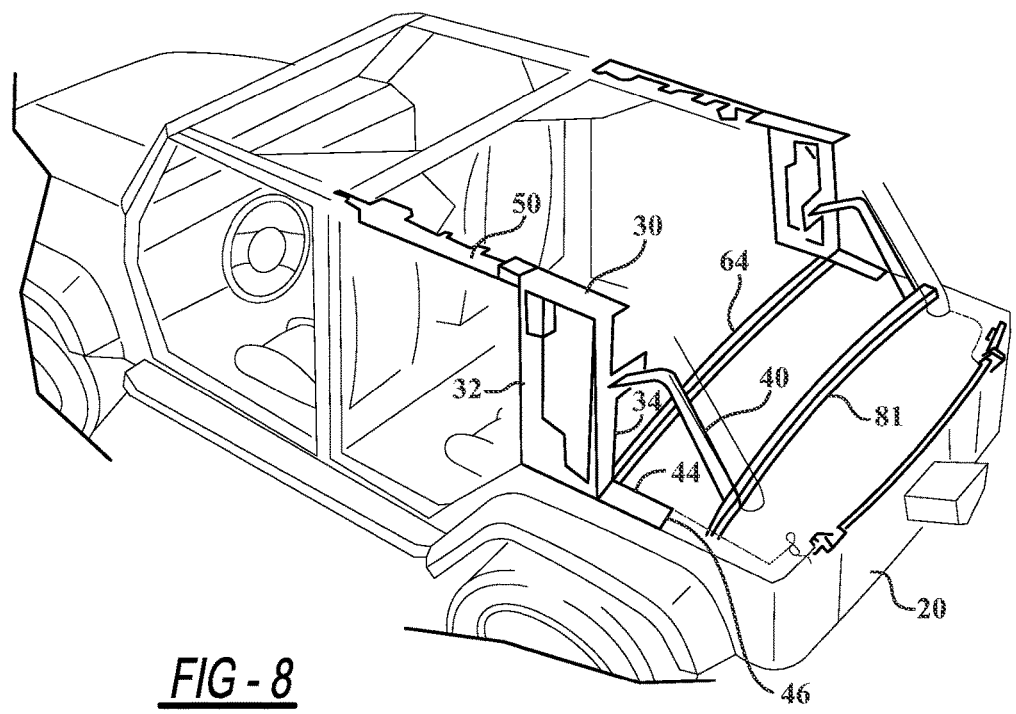

Referring to FIGS. 7 and 8, a top system 7 for a four-door Jeep type vehicle 10 is provided. The vehicle 10 has a front seating portion 12 and a rear seating portion 14. The vehicle 10 has a rear cargo area 16. The rear cargo area 16 juxtaposes rear wheel wells 18. The cargo area 16 is closed by a pivotal cargo gate 20 (see FIG. 1). The vehicle 10 has parallel spaced roll bars 22. The roll bars 22 have a horizontal portion 24 that extends adjacent to at least the rear seating portion 14 of the vehicle and often extends forwardly therefrom to be adjacent the front seating portion 12 of the vehicle connecting with the windshield 26. The roll bars 22 also have a vertically inclined portion 28 that is slanted towards the cargo area 16.

The top system 7 has two parallel spaced apart C pillars 30. Each C pillar includes a front vertical column 32. The C pillars 30 also have a rear vertical column 34. The rear vertical column 34 has a perpendicularly connected seat belt pass through 36. Seatbelt pass through 36 extends towards a longitudinal centerline 38 of the vehicle 10. A seat belt 40, typically a shoulder restraint for a rear passenger, extends through the pass through 36 and is then held up by a hangar (not shown) and then proceeds generally adjacent the inclined portion 28 of the roll bar entering into the cargo area 16 to a retractor (not shown) anchored to a mount on an interior surface of the wheel well 18, another structure of the vehicle body. The C pillars 30 along their bottom ends have a bottom plate 44 that connects a bottom end of front and rear columns 32 and 34. The bottom plate 44 longitudinally extends rearwardly beyond rear column 34. The bottom plate is fixedly connected to a top deck 46 of the vehicle rear end. A top plate 48 connects front columns along their top ends. The C pillars 30 also have a connected sealing plate 50. The sealing plate 50 is provided for a surface or a support for surface utilized sealing a rear door (not shown). The sealing plate 50 is typically connected to C pillar front column 32 and is also typically connected with the horizontal portion 24 of the roll bar.

Figure 1:
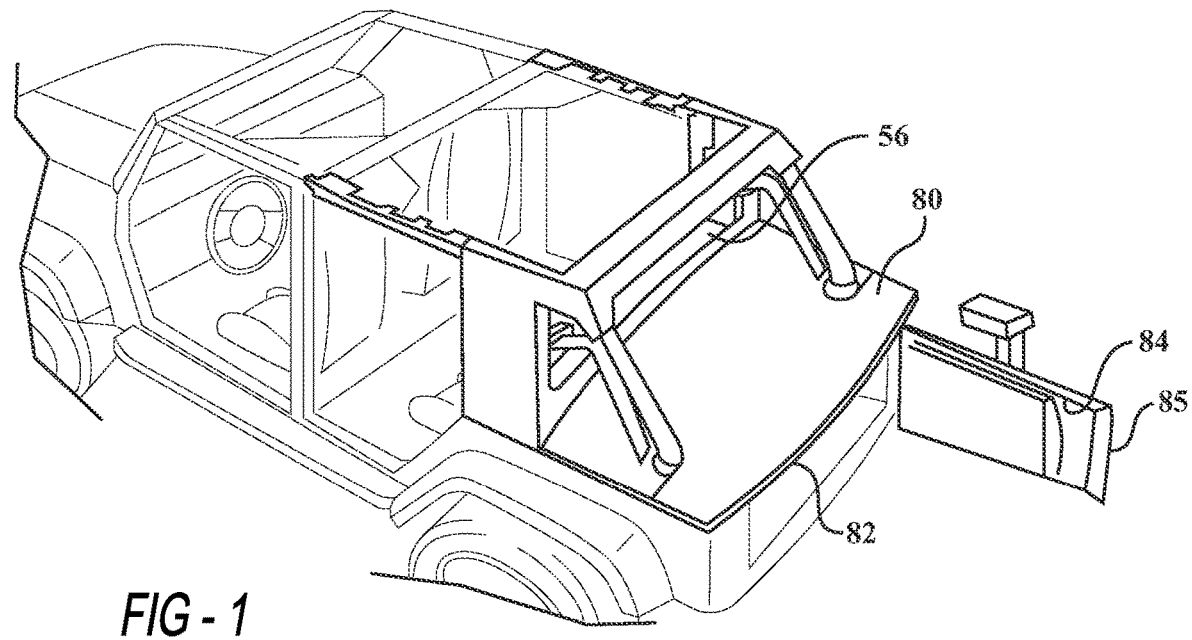
FIG. 1 illustrates an embodiment of the invention wherein a cover for the cargo storage interlocks with a cargo tailgate.
Figure 2:
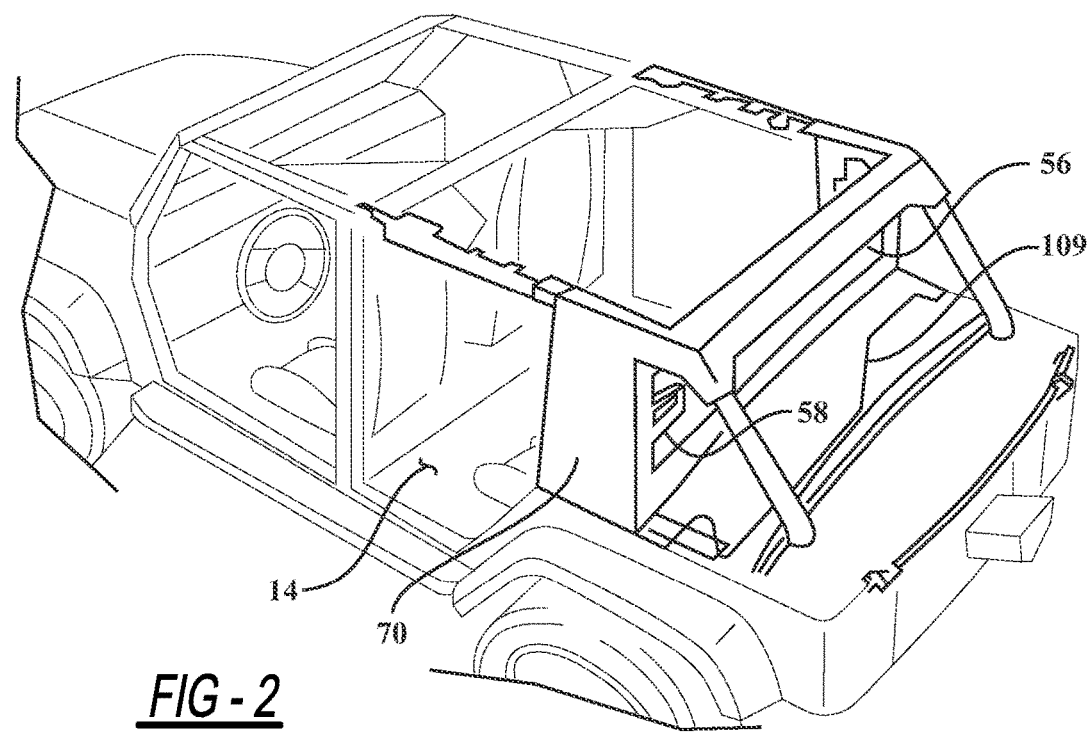
FIG. 2 illustrates an embodiment of the invention wherein the deck cover is removed to enhance passenger enjoyment.

As shown better in FIGS. 1 and 2, the top system 7 has a vertical rear window 56. The rear window 56 has a cut out, providing allowance of pass through 36 for the rear seatbelts. Typically, the window 56 is mounted in zipperless fashion as mentioned in U.S. Pat. No. 9,238,400 or one of the U.S. Patent Applications claiming priority thereto, the disclosures of which are incorporated by reference herein.

A transverse bow 64 is provided connecting a bottom of C pillar rear columns 34 together. In some embodiments a lighting fixture is connected with bow 64, lighting cargo area 16.

Figure 5:
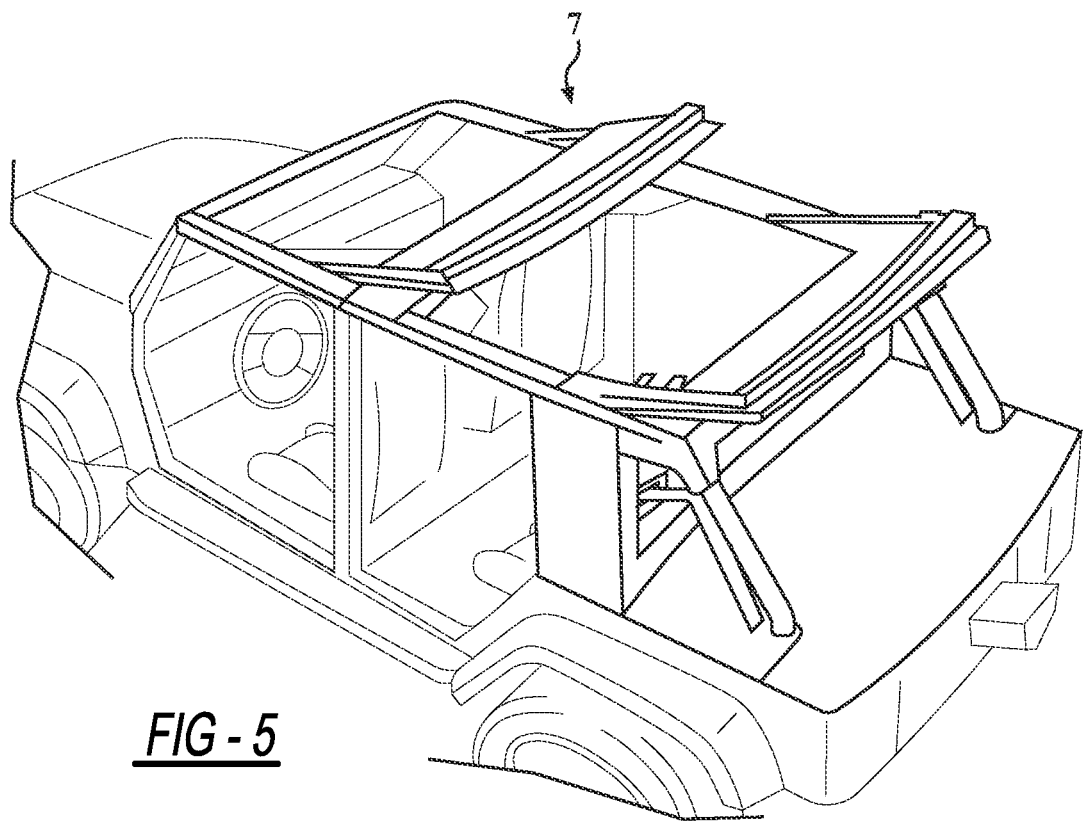
FIG. 5 illustrates an embodiment of the invention wherein the deck over the front and rear passenger portions is removable.
Figure 6:
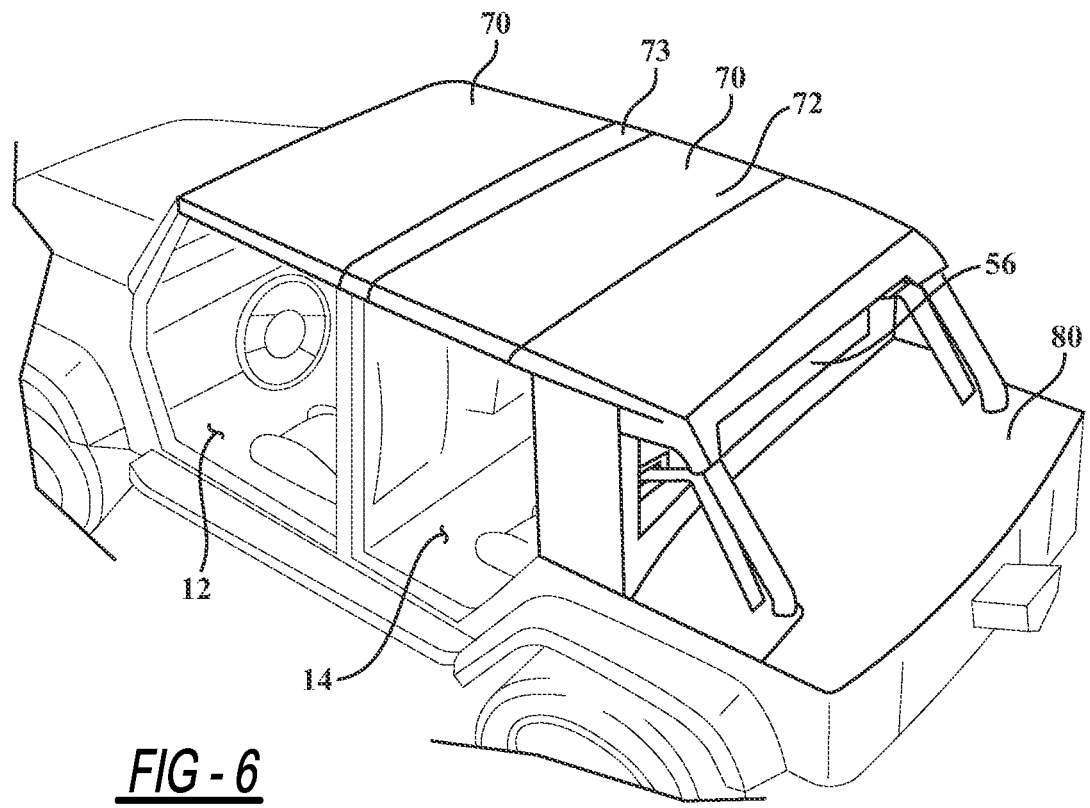

As best shown in FIGS. 5 and 6 a fabric cover 70 provides a top deck 72 extending over front and rear seating portions 12, 14 of the vehicle 10. The fabric cover 70 also provides a covering and encircles rear window 56.

The seat system also provides a tonneau cover 80 for the rear cargo area providing a flat surface closure over the rear cargo area 16.

In FIG. 6 the tonneau cover 80 is a hard (stiff) cover. In FIG. 8 a fabric soft tonneau cover (not shown) is utilized. To hold up the soft tonneau cover there is provided a bow 81. In FIG. 1, a hard cover 80 is utilized which has an edge 82 that interlocks with a locking edge 84 provided on a vertically swinging tailgate 85 to provide a lockable rear storage when the tailgate is closed and appropriately locked.

FIGS. 1 and 2 provide the cover top system 7 with the deck cover 72 removed to enhance operator enjoyment of the environment.

Figure 3:
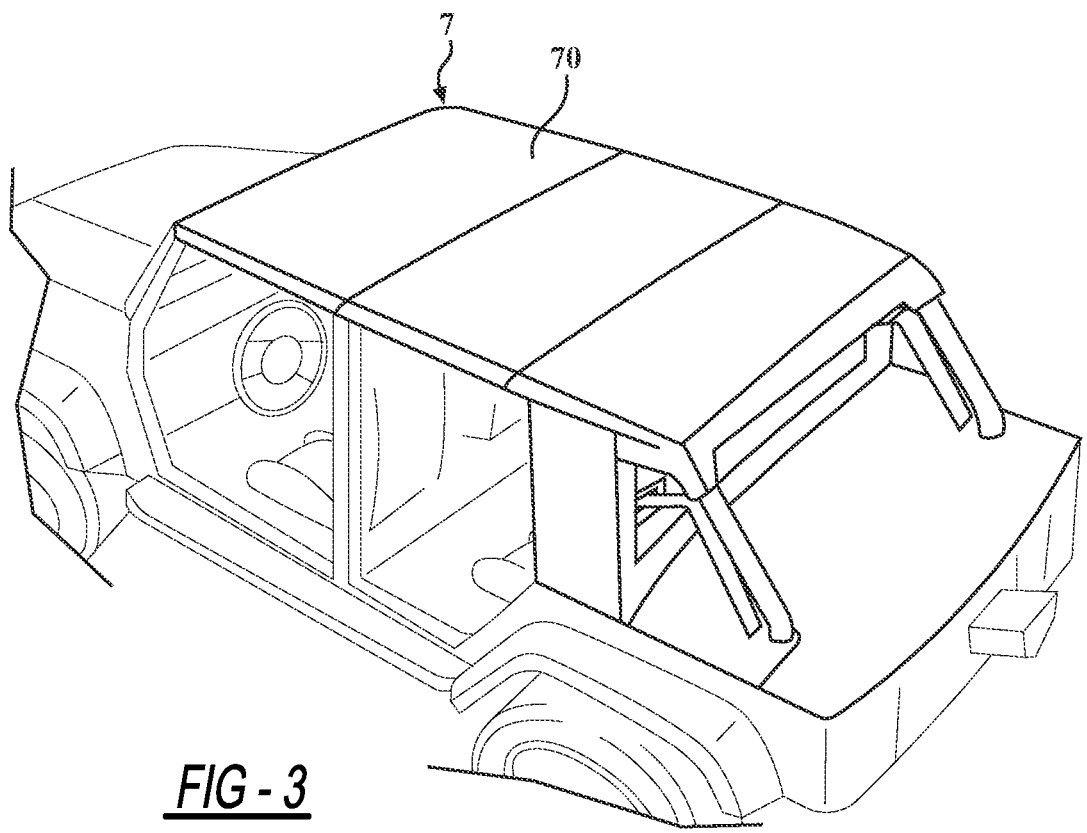
FIG. 3 illustrates an embodiment of the invention wherein the deck panels of FIG. 1 are reconnected with the vehicle.
Figure 4:
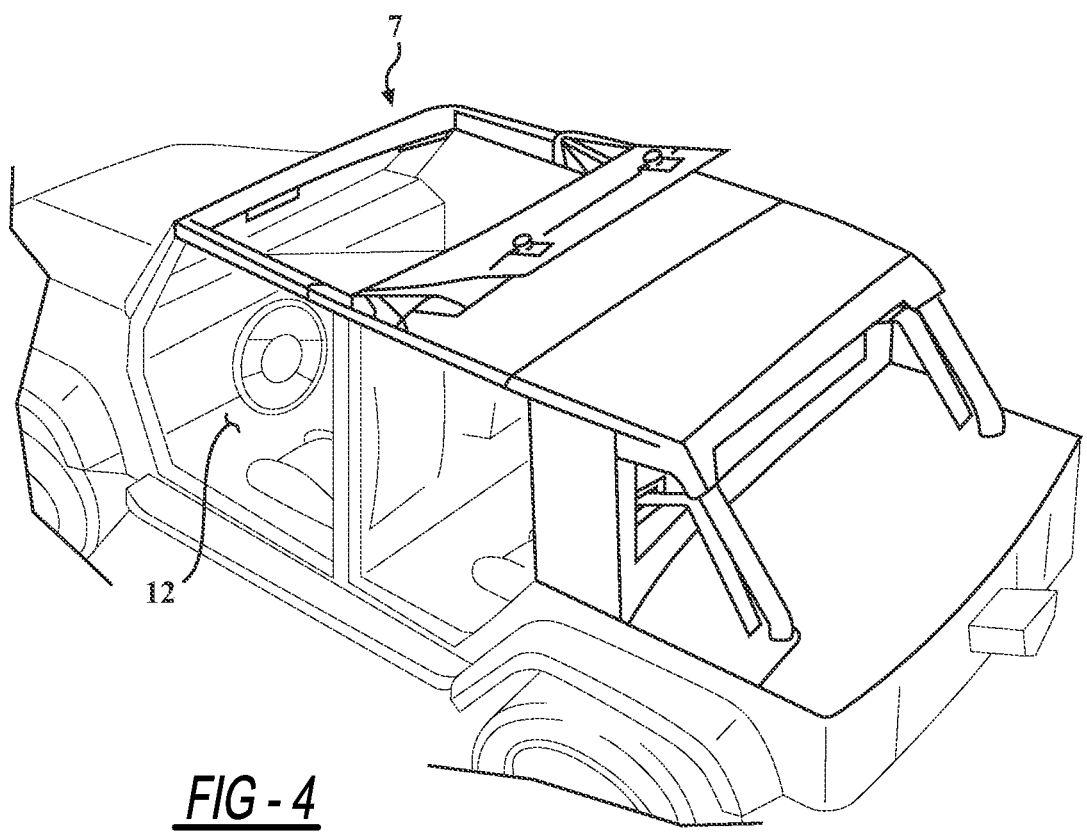
FIG. 4 illustrates an embodiment of the invention wherein the deck over the front passenger area is removable.

FIG. 3 provides the top system 7 with the deck panels shown removed in FIG. 1 reconnected with the vehicle 10. FIG. 4 illustrates top system 7 of the present inventions where a panel over the front seating portion 12 is removable. FIGS. 5 and 6 illustrate top system 7 of the present invention having panels openable over the front and rear seating portions 12, 14 of the vehicle 10 and additionally having a hard mid deck 73. The mid deck 73 provides a sealing surface between two tops such as two fold back type tops such as Sunrider for Hardtop by Bestop or pivot back top or the front or the rear and a hard top panel on the other side of the mid deck 73. The openable panels in FIG. 5 can be operated according to the principles discussed in PCT/US2015/022716, U.S. application Ser. No. 14/222,156 and U.S. patent application Ser. No. 15/595,396, which are hereby incorporated by reference in the present application.

Figure 12:
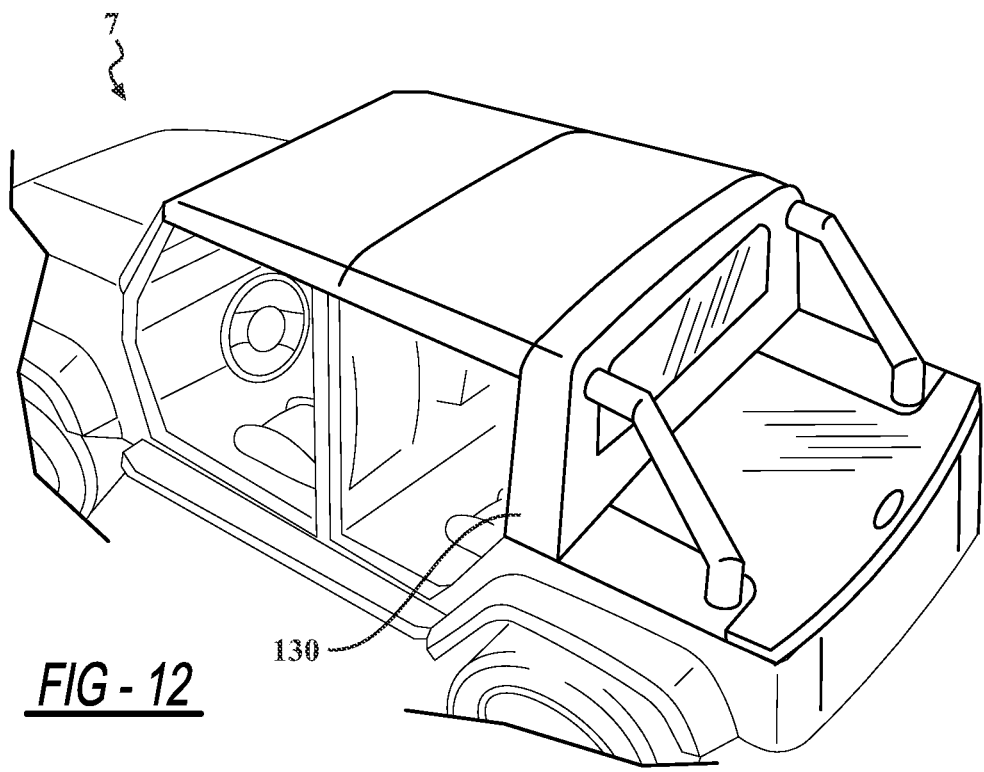
FIG. 12 illustrates an embodiment of the invention with a thin profile C pillar.

FIG. 12 illustrates a top system 7 according to the present invention having a thin profile C pillar 130 wherein the front and rear columns of the C pillar are longitudinally closer to one another.

Figure 13:
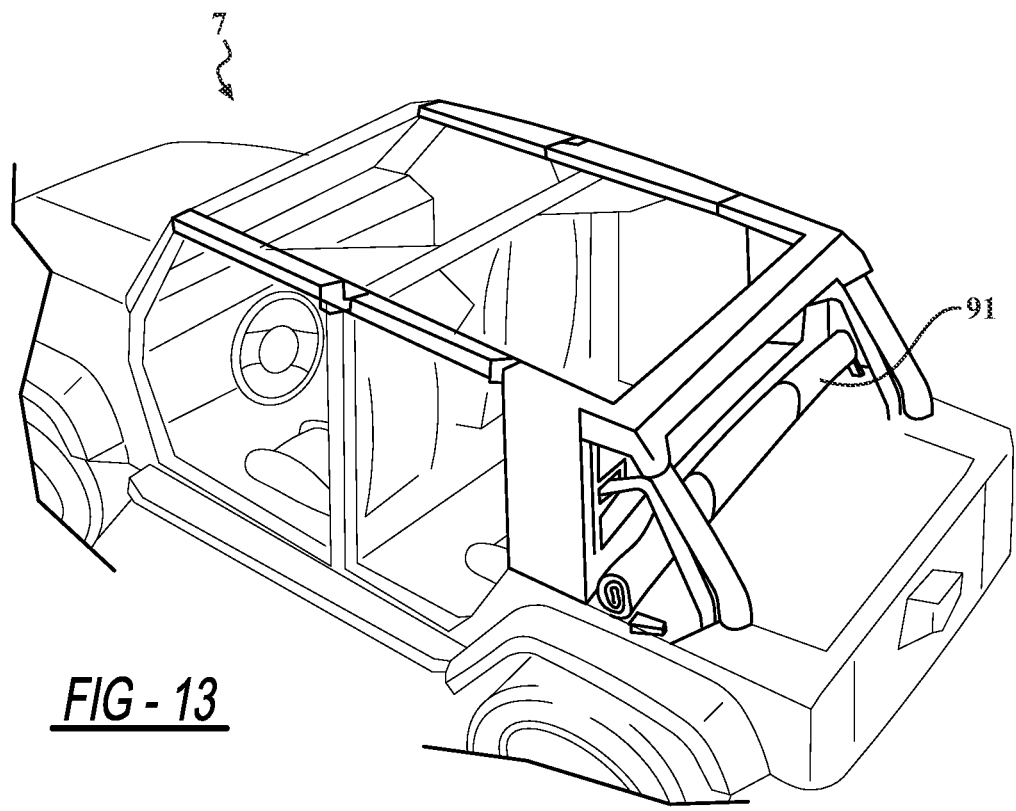
FIG. 13 illustrates an embodiment of the invention with a roll up tonneau cover.
Figure 14:
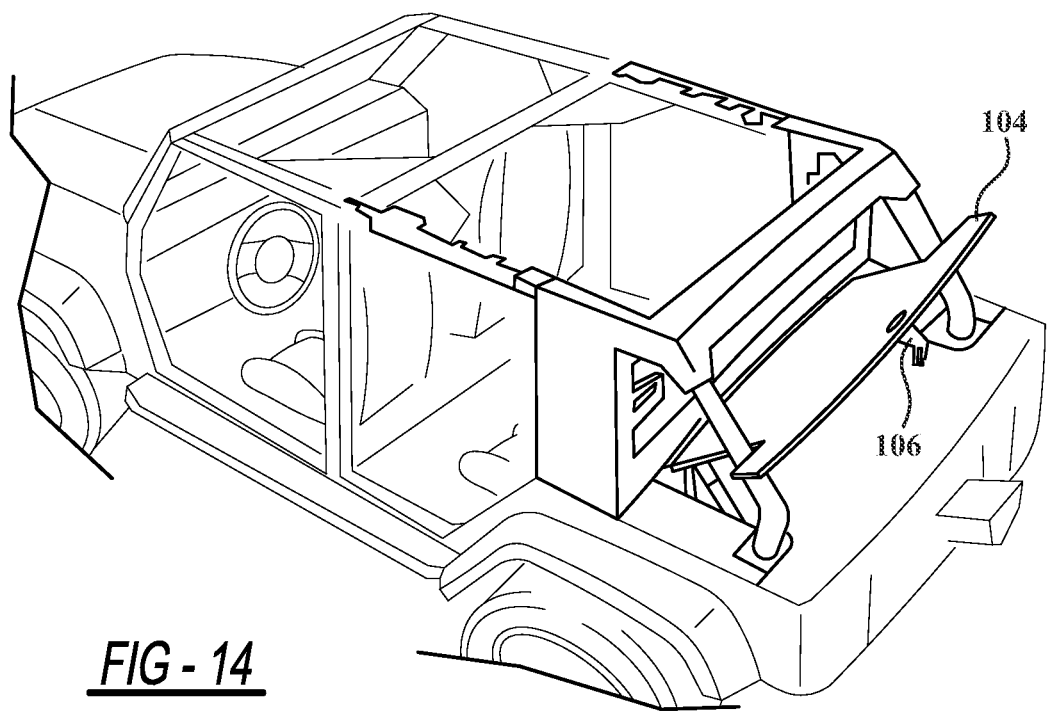
FIG. 14 illustrates an embodiment of the invention with a pivotal lockable tonneau cover.

FIG. 13 illustrates an embodiment of the present invention top system 7 having a roll-up tonneau cover 91. FIG. 14 illustrates an embodiment of the present invention top system 7 having a hard tonneau cover 104 that is also pivotal, having a lock 106 to secure the cargo area 16. FIG. 2 illustrates an embodiment for the system further including a forward plate 109 isolating the cargo area 16 from the rear seating portion of the vehicle.

Figure 10:
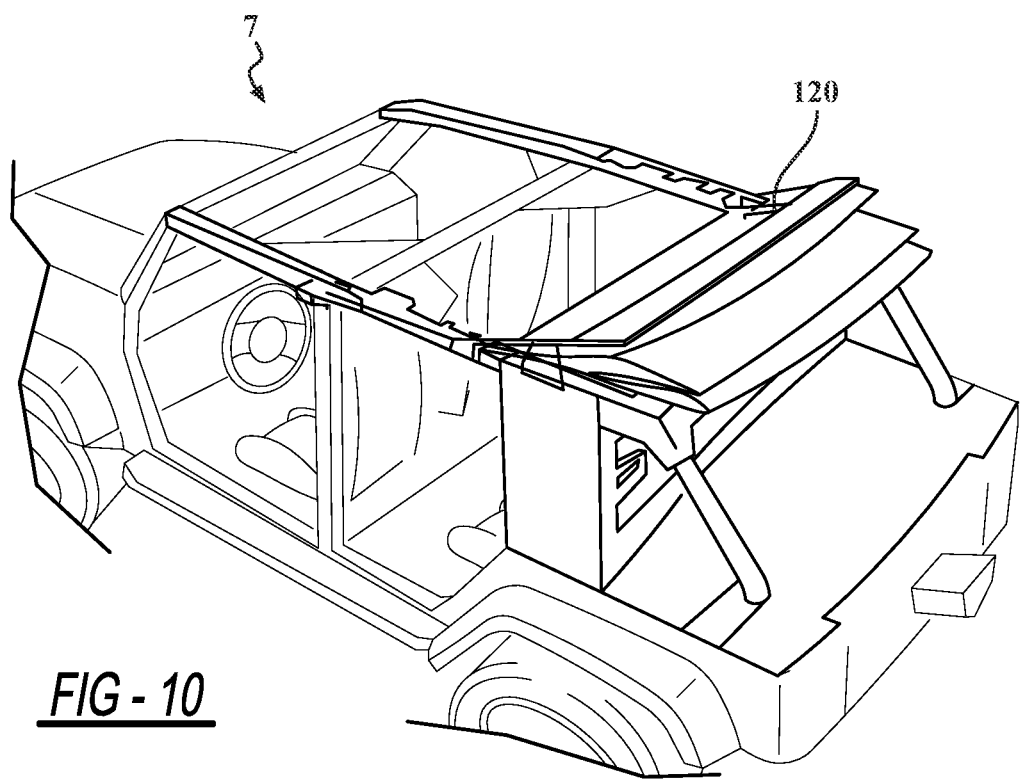
FIG. 10 illustrates an embodiment of the invention with a sliding mid-deck.

FIG. 10 provides an embodiment of the top system 7 with a sliding mid-deck 120.

Figure 9:
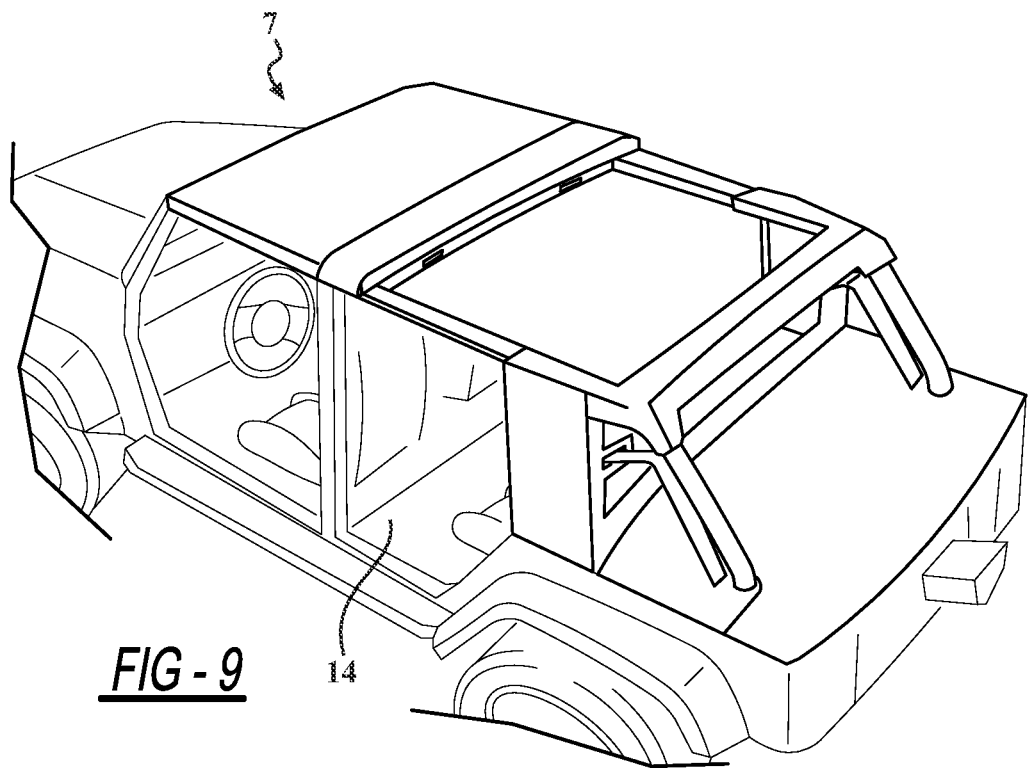
FIG. 9 illustrates an embodiment of the invention wherein the panel over the rear passenger seat is removable.

FIG. 9 provides an embodiment of the top system 7 with an openable panel (panel removed) over the rear seating portion 14.

Figure 11:
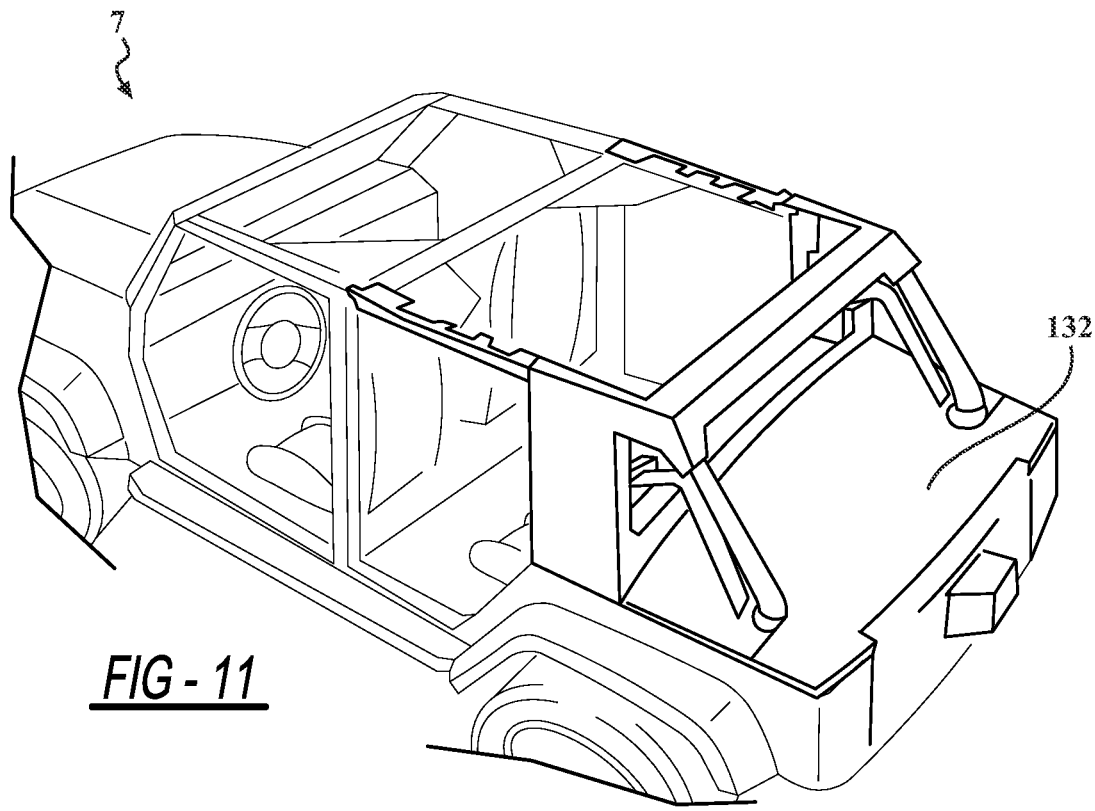
FIG. 11 illustrates an embodiment of the invention with a flat soft top tonneau cover.

FIG. 11 provides an embodiment of the top system 7 with a flat soft tonneau cover 132.

With respect to top systems and zipperless window systems of the present invention specific configurations of these which are useful in claimed combinations of the present invention include U.S. application Ser. No. 15/128,773, filed Sep. 23, 2016, "LIFT ASSIST MECHANISM FOR SOFT TOP," which will issue as U.S. Pat. No. 9,944,155, dated Apr. 17, 2018; U.S. Pat. No. 9,238,400, dated Jan. 19, 2016, "ZIPPER LESS REMOVABLE WINDOWS FOR A FOLDING SUV SOFT TOP;" U.S. Pat. No. 9,931,921, dated Apr. 3, 2018, "SOFT FRONT COCKPIT COVER;" U.S. application Ser. No. 15/595,396, filed May 15, 2017, "SLIDING/FOLDING SLANTED BACK SOFT TOP ASSEMBLY FOR SUV;" and U.S. Provisional Application 62/486,226, filed Apr. 17, 2018, "ZIPPER LESS REMOVABLE WINDOWS FOR A FOLDING SOFT TOP," which are hereby expressly incorporated by reference in the present patent application. The present invention further incorporates by reference herein the disclosures of International Application No. PCT/US2015/022716, U.S. patent application Ser. No. 14/222,156, and U.S. patent application Ser. No. 15/595,396.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A top system for a four-door Jeep type vehicle having a cargo area rear of a rear seating portion of said vehicle, said cargo area juxtaposing rear wheel wells of said vehicle, said cargo area being closed by a pivotal rear cargo gate, said vehicle having parallel spaced roll bars with a horizontal portion adjacent at least a rear seating portion of said vehicle and said roll bars having an inclined portion slanted towards said cargo area, said top comprising:

parallel spaced apart C pillars, said C pillars including a front vertical column and a rear vertical column, said rear column having a perpendicularly connected seat belt pass-through extending towards a longitudinal centerline of said vehicle, said C pillars also having longitudinal extending bottom plates connecting said front and rear columns, said bottom plate extending beyond said rear column, and said C pillar also including a top plate connecting said front and rear columns along a top end of said front and rear columns and said C pillars including connected sealing plates for sealing a top end of a rear door, said sealing plates also being connected to said roll bars;

a vertical rear window extending between said C pillar rear columns, said rear window having a cutout portion for allowance of passage of a seat belt;

a fabric cover providing a top deck extending over a front and said rear seating portion of said vehicle, said cover also covering said C pillars and said rear window;

a rear bow connecting said C pillars' rear columns adjacent a bottom end of said columns; and a tonneau cover for said rear cargo area providing a flat surface enclosure of said rear cargo area.

2. The top system as provided in claim 1 wherein said top deck has an openable panel.

3. The top system as provided in claim 2 further including a front panel openable over the front seating portion and a rear panel openable over said rear seating portion.

4. The top system as provided in claim 3 having a hard mid deck between said front and rear panels.

5. The top system as provided in claim 1 having a sliding top deck.

6. The top system as provided in claim 1 having a hard tonneau cover.

7. The top system as provided in claim 1 having a soft fabric tonneau cover.

8. The top system as provided in claim 7 having a rolled soft fabric tonneau cover.

9. The top system as provided in claim 6 having a sliding opening top deck.

\* \* \* \* \*